Nov. 17, 1959     E. A. MORI     2,912,994
FLUID PROPORTIONING VALVE

Filed Feb. 5, 1954     2 Sheets-Sheet 1

INVENTOR.
ERNEST A. MORI
BY
*Horace H. Cooke*
ATTORNEY

Nov. 17, 1959  E. A. MORI  2,912,994
FLUID PROPORTIONING VALVE
Filed Feb. 5, 1954  2 Sheets-Sheet 2

INVENTOR.
ERNEST A. MORI
BY
Horace H. Cooke
ATTORNEY

United States Patent Office 2,912,994
Patented Nov. 17, 1959

2,912,994

FLUID PROPORTIONING VALVE

Ernest A. Mori, Pittsburgh, Pa., assignor to Gulf Research & Development Company, Pittsburgh, Pa., a corporation of Delaware Application February 5, 1954, Serial No. 408,494

7 Claims. (Cl. 137—98)

This invention relates to a fluid proportioning valve which is adjusted by longitudinal positioning of a valve piston within a cylinder, to control the admission of fluids from several sources in predetermined ratio and to blend them into a common discharge line without interruption or change in total quantity of flow resulting as a consequence of changing the ratio of the inlet fluids.

The valve of this invention may be usefully employed in various operations where the constituent fluids must be mixed in strictly maintained proportions, as for example, in the blending of test fuels for internal combustion engines. In such use as in many others, it is important that the blend be of unvarying composition throughout a single test and that the effluent be neither interrupted nor varied in quantity when the valve is adjusted to change proportions of the fuels to be blended. Also, where the ratio of feed is such that one fuel flows to the valve at a higher rate than the other, with consequent unequal lowering of level in the respective supply tanks, the resulting differential lift pressure in the supply lines leading to the valve will cause a change in the desired ratio of feed unless compensation is made by varying the openings of the respective inlet ports.

In the present invention, flow of the blend in constant quantity is achieved by providing the valve with inlet ports of such geometric shape that the ratio of the sides of the port openings remains constant for any valve setting, a condition which is not obtained where the ports are of conventional circular or elongated rectangular shape. Compensation for change in lift pressure is automatically accomplished in the present invention by mounting the valve piston between springs so that it may move in either direction from its initial setting in response to unequal pressures of the feed fuels, whereby flow through the respective inlet ports is varied as required to re-establish a pressure balance.

Figure 1:
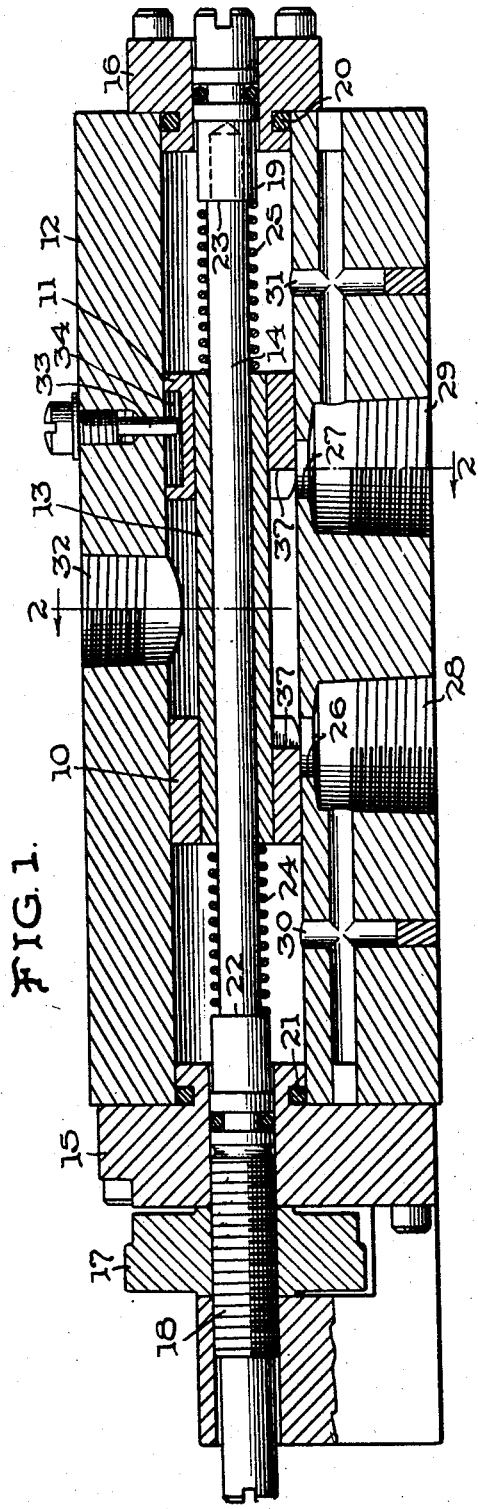
Figure 1 is a longitudinal sectional view.

Referring more particularly to the drawings, the valve comprises a piston of the spool type, having enlarged heads 10 and 11 which fit closely within cylinder 12 and which are connected by a sleeve 13 slidably mounted on a stem 14.

The stem 14 extends axially of the cylinder and through its end closures 15 and 16, the closure 15 being bifurcated to support the stem at spaced points and to retain an adjusting nut 17 which engages micrometer screw threads 18 on the projecting end of the stem by which the stem may be advanced and retracted longitudinally of the cylinder. At its opposite end the stem is threaded to receive a larger diameter extension 19 which closely fits the opening in closure 16. O-ring seals 20 and 21 between the stem and end closures prevent leakage.

The stem has a stepped diameter defining a shoulder 22 which is spaced from and opposed to shoulder 23 of the enlarged extension 19, these shoulders constituting abutments for coiled springs 24 and 25 which extend into contact with the heads 10 and 11.

The cylinder 12 is formed with inlet ports 26 and 27 in communication with threaded sockets 28 and 29 which are provided for pipe connection to tanks from which the fluids to be blended are supplied, and with branch conduits 30, 31 which lead from the inlets to opposite ends of the cylinder.

An outlet 32 which is located between the piston heads 10 and 11 is threaded for pipe connection to the inlet of a pump (not shown) which discharges the blended fluid. In order that this outlet may be unobstructed at all times, a stop is provided for limiting movement of the valve piston to such an extent that it cannot cover the outlet. This stop, as shown in Figure 1, is in the form of a pin or key 33 which rides in a slot 34 formed in one of the valve piston heads, the slot being of sufficient length to permit adjustment of the piston to cover completely either of the inlet ports or to assume any intermediate position, with one port partly open and the other partly closed. Furthermore, the pin 33 riding in slot 34 prevents the piston from rotating within the cylinder 12. As a consequence, in the case of diamond or square ports, where additional passages are formed in the piston, these passages will remain in the same plane for all port openings.

Port shape influences the flow characteristics of a proportioning valve, for the areas of the inlet ports are varied with adjustment. However, where conventional ports, such as circular ones, are embodied in the valve design the port co-efficient varies with opening and closing. In order to maintain a constant co-efficient, the geometric port shape must remain the same in the various positions of valve adjustment; that is to say, the ratio of the sides of the port openings is unchanged for all settings of the valve. The requirement is met by ports shaped as an equilateral triangle, isosceles triangle, diamond or square.

Figure 3:
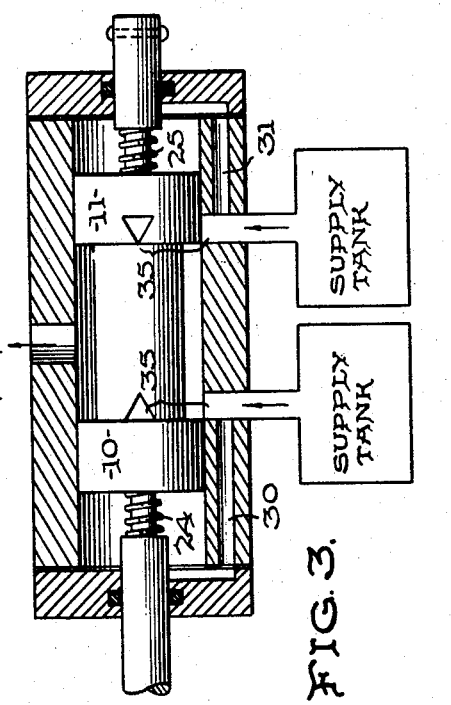
Figure 3 is a simplified sectional view showing triangular inlet ports rotated 90 degrees from position in order to illustrate their relationship to the spaced heads of the valve piston with the left hand port open and the right hand port closed.
Figure 2:
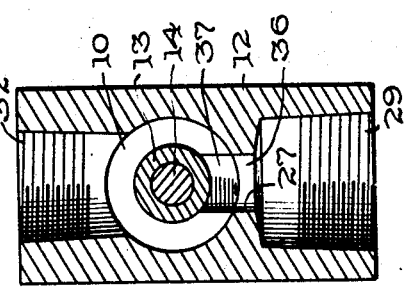
Figure 2 is a transverse sectional view taken along the line 2—2 of Figure 1.
Figure 4:
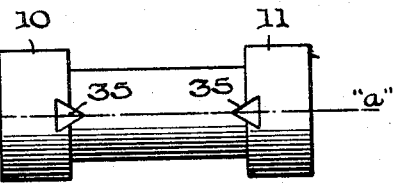
Figure 4 is a simplified showing of the valve with triangular ports, the piston being in the position where each port is equally open.
Figure 5:
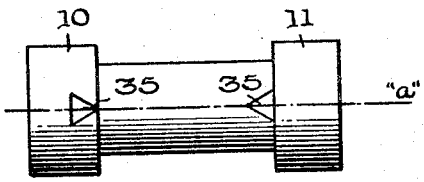
Figure 5 is a simplified view of the valve with triangular ports, showing the piston at one extreme of its movement, wherein the right hand port is fully open and the left hand port fully closed.
Figure 6:
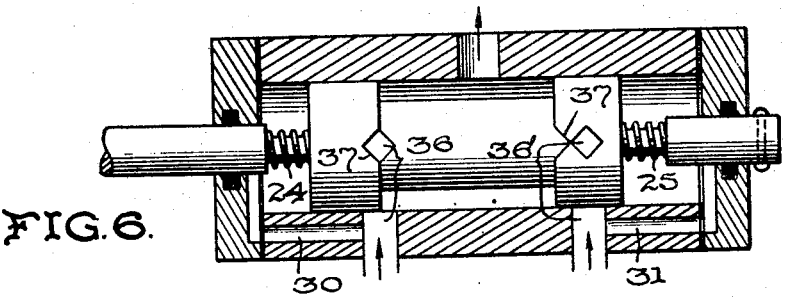
Figure 6 is a simplified longitudinal section in which diamond shaped ports are shown rotated 90 degrees from the position in the manner of Figure 3, with the valve piston in one extreme of its movement wherein the left hand port is open and that at the right is closed.
Figure 7:
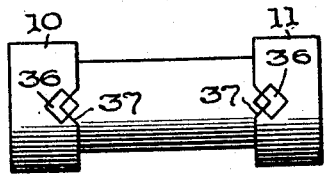
Figures 7 and 8 are simplified views of the valve with diamond shaped ports, these being equally open in Figure 7, and in Figure 8 with the right hand port fully open and the left hand port closed.
Figure 8:
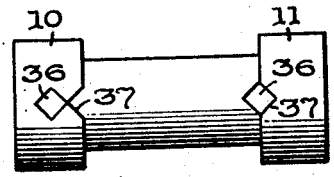

As illustrative of these shapes, Figures 3–5 show the ports 35 as equilateral triangles, the apexes of which are opposed to each other and the angles bisected by a line "a" extending in the direction of piston movement longitudinally of the cylinder. As the cut-off edges of the valve heads 10 and 11 move across the ports, opening one and closing the other, the geometrical shape of the ports is unchanged. In Figures 1, and 6 to 8 inclusive, diamond-shaped ports 36 are shown. Here, too, the inner surfaces of the valve heads define the cut-off edges for the ports. In the case of diamond or square ports, however, additional passages 37 are required in these cut-off edges to preserve the shape of the port as its area is varied. As shown, these passages 37 at the cut-off edge are of the same angularity as the diamond or square ports, equal to one-half the port area, and of the same geometric shape as the half-port.

The stem 14 is initially adjusted to position the valve so that the constituent fluids to be blended are admitted in selected proportion. However, if one fluid is more viscous than the other, or if one source is more depleted than the other, the lift pressure exerted in one fluid will be greater than on the other, causing a change in the ratio of their flow to the valve. In order to compensate for that effect, and to restore the desired flow ratio, the present invention provides branch passages 30 and 31 leading from the respective inlets to opposite ends of the cylinder. Thus, if the fluid from one supply tank exerts more pressure on one end of the valve than is exerted on its opposite end by fluid from the other source, the valve will be shifted against the resistance of spring 24 or 25, as the case may be, to vary the inlet port openings and thereby re-establish pressure balance.

What I claim as my invention is:

1. A fluid proportioning valve comprising a cylinder having spaced inlet ports and an outlet port intermediate thereof, closures for the ends of the cylinder, a stem extending through said cylinder and through said end closures, means exterior of the cylinder for adjusting said stem longitudinally to selected position, a valve piston slidably mounted on said stem, said valve piston having spaced heads closely fitting within the cylinder and a connecting sleeve between said heads through which said stem extends, spring means on said stem for yieldingly locating said valve piston on said stem, the said inlet ports being of such shape and so arranged that as the piston heads move thereacross the sides of the port openings are in constant ratio and the geometrical shape of the port openings is unchanged, inlet lines communicating with said inlet ports, and passageways in said cylinder leading off from said inlet lines prior to said inlet ports and communicating with the interior of said cylinder intermediate the end closures thereof and the piston heads, whereby pressure of the fluids entering the valve through said inlet ports will be applied to the ends of the piston causing it to shift with respect to the inlet ports in the event the pressure of one such fluid is greater than that of the other, thereby maintaining a preselected ratio of flow as determined by initial adjustment of the stem and piston.

2. A fluid proportioning valve comprising a cylinder, a spool-type piston having spaced heads fitting closely within the cylinder said heads having cut-off edges thereon and a connecting sleeve of smaller diameter, a stem extending through said cylinder with sliding fit within the sleeve and at least one end of said stem projecting beyond one end of the cylinder, means exterior of the cylinder for adjusting the stem and piston carried thereby to various positions longitudinally of the cylinder, spring means on the stem and abutting said piston for yieldingly mounting the piston for limited movement along the stem, spaced inlet ports in the cylinder so located that when one port is completely uncovered by one piston head the other is completely covered by the other piston head, said inlet ports having a diamond shape and so arranged as to be bisected through the apexes thereof by a line extending in the direction of piston movement, and passages in the respective piston heads at the cut-off edges thereof, of the same angularity as the inlet ports, each passage being of the same geometric shape as one-half of each inlet port and being equal in area to one-half of each port area the apexes of the passages in the respective piston heads at the cut-off edges thereof being oppositely disposed, inlet lines communicating with said inlet ports, and passageways in said cylinder leading off from said inlet lines prior to said inlet ports and communicating with the interior of said cylinder beyond the outer ends of said valve piston.

3. The valve of claim 2, wherein the inlet ports are of square shape.

4. The valve of claim 1 wherein the inlet ports are of equilateral-triangle shape.

5. The valve of claim 1 wherein the inlet ports are of isosceles-triangle shape.

6. The valve of claim 1 wherein the inlet ports are of diamond shape.

7. The valve of claim 1 wherein the inlet ports are of square shape.

References Cited in the file of this patent

UNITED STATES PATENTS

| 868,680 | Martin | Oct. 22, 1907 |
|---|---|---|
| 962,111 | Assman | June 21, 1910 |
| 1,638,152 | Gabriel | Aug. 9, 1927 |
| 1,993,790 | Kinsella | Mar. 12, 1935 |
| 2,311,955 | Merker | Feb. 23, 1943 |
| 2,423,264 | Stephens | July 1, 1947 |
| 2,466,485 | Schultz | Apr. 5, 1949 |
| 2,563,138 | Smith | Aug. 7, 1951 |

FOREIGN PATENTS

| 107,559 | Germany | Dec. 14, 1899 |